United States Patent [19]
Tokumoto et al.

[11] Patent Number: 5,867,271
[45] Date of Patent: Feb. 2, 1999

[54] MICHELSON INTERFEROMETER INCLUDING A NON-POLARIZING BEAM SPLITTER

[75] Inventors: Isao Tokumoto; Shigeki Nishina, both of Gyoda, Japan

[73] Assignee: Advantest Corporation, Tokyo, Japan

[21] Appl. No.: 491,907

[22] PCT Filed: Nov. 11, 1994

[86] PCT No.: PCT/JP94/01905

§ 371 Date: Jul. 14, 1995

§ 102(e) Date: Jul. 14, 1995

[30] Foreign Application Priority Data

Nov. 17, 1993 [JP] Japan ................................. 5-066232
Jun. 15, 1994 [JP] Japan ................................. 6-156701

[51] Int. Cl.$^6$ ................................................ G01B 9/02
[52] U.S. Cl. ................................. 356/351; 356/358
[58] Field of Search .......................... 356/345, 346, 356/351, 358

[56] References Cited

U.S. PATENT DOCUMENTS

| | | | |
|---|---|---|---|
| 4,360,271 | 11/1982 | Downs et al. | 356/351 |
| 4,693,605 | 9/1987 | Sommargren | 356/351 |
| 4,702,603 | 10/1987 | Augustyn | 356/351 |
| 4,893,931 | 1/1990 | Lefeure et al. | 356/351 |
| 5,104,223 | 4/1992 | Gremillion | 356/345 |
| 5,402,230 | 3/1995 | Tian et al. | 356/345 |
| 5,671,047 | 9/1997 | Curbelo | 356/346 |

FOREIGN PATENT DOCUMENTS

| | | |
|---|---|---|
| 0 277 496 A2 | 8/1988 | European Pat. Off. . |
| 37 03 086 C2 | 8/1988 | Germany . |
| 49-56645 | 6/1974 | Japan . |
| 62-70720 | 4/1987 | Japan . |
| 63-21503 | 1/1988 | Japan . |
| 63-195547 | 8/1988 | Japan . |
| 63-199547 | 8/1988 | Japan . |
| 1-143925 | 6/1989 | Japan . |
| 2-140638 | 5/1990 | Japan . |
| 4-323502 | 11/1992 | Japan . |
| 6-63867 | 8/1994 | Japan . |

OTHER PUBLICATIONS

International Search Report, Dated Feb. 28, 1995, For International Application No. PCT/JP94/01905.
Catalog on "Laser Line Non–Polarizing Plate Beamsplitters", Melles Griot, pp. 11–5 and 11–6.

*Primary Examiner*—Robert Kim
*Attorney, Agent, or Firm*—Staas & Halsey

[57] ABSTRACT

A light power spectrum is accurately measured, in spite of the polarized light-dependency of the non-polarizing beam splitter 12. Incident light 11 is separated by a polarizing/separating element 31 into orthogonal polarized light components 11a and 11b. The orthogonal polarized light components have their polarizing directions rotated by 45 degrees in opposite directions with respect to their P wave components and S wave components at the reflecting/transmitting face of the non-polarizing beam splitter. The reflected and transmitted from the non-polarizing beam splitter 12 are reflected by a stationary reflector 16 and a moving reflector 17 back to the non-polarizing beam splitter 12 and are recombined to interfere with each other at the reflecting/transmitting face of the non-polarizing beam splitter. The resulting interference lights are received by a common light-receiver.

6 Claims, 7 Drawing Sheets

MICHELSON INTERFEROMETER INCLUDING A NON-POLARIZING BEAM SPLITTER

TECHNICAL FIELD

This invention relates to a Michelson interferometer in which incident light is divided by a non-polarizing beam splitter into two beams which are then projected onto a stationary reflector and a moving reflector, the light beams being reflected from the respective reflectors back into the beam splitter where they are recombined to interfere with each other, and the resulting interference light being converted to an electric signal to obtain a light power spectrum of the incident light.

BACKGROUND ART

The measurement of a light power spectrum using a prior art Michelson interferometer will be described with reference to FIG. 1. Incident light 11 to be measured enters a non-polarizing beam splitter 12 where it is divided into reflected light 14 and transmitted light 15 at the reflecting/transmitting face 13 of the non-polarizing beam splitter 12 angled at 45 degrees to the incident radiation direction. The reflected light 14 and transmitted light 15 are directed at a stationary reflector 16 and a moving reflector 17, respectively. The two light beams 18 and 19 reflected from the stationary and moving reflectors 16, 17 enter the reflecting/transmitting face 13 of the non-polarizing beam splitter where they are recombined to interfere with each other, and the resulting interference light rays emerge therefrom as light beams 21 and 22 orthogonal to each other.

The stationary reflector 16 is fixed in position, so that the length $L_1$ of the optical path is invariable along which the light travels as it is reflected from the non-polarizing beam splitter 12 and further reflected by the stationary reflector 16 back into the non-polarizing beam splitter 12. On the other hand, the moving reflector 17 is moved back and forth by a drive means, not shown, so that the length $L_2$ of the optical path is continuously variable along which the light transmitted through the non-polarizing beam splitter 12 travels as it is reflected by the stationary reflector 16 back into the non-polarizing beam splitter 12.

One 21 of the interference rays is introduced into a light receiver 23 where it is converted into an electric signal which is in turn passed to a high-pass filter 24 from which a DC (direct current) component is extracted corresponding to a change in intensity of the interference light 21 that occurs as the moving reflector 17 is moved. The resulting DC signal is converted by an A/D converter 25 to a digital signal which may be fast-Fourier transformed at a Fourier transform processor 26. A power spectrum of the incident ray being measured corresponding to the wavelength obtained through the transformation is thus displayed at a display 27.

Incidentally, the non-polarizing beam splitter 12 has so-called polarized light-dependency in that the reflectivity (or transmittance) thereof varies depending upon the polarization state of the incident light 11. This polarized light-dependency poses the problem that incident ray 11 having different polarization states will vary in the level of power spectrum measured even if they have the same power. This will be further discussed below. Let it be that the amplitude and wavelength of the incident light 11 are $E_0$ and $\lambda$, respectively; the wave number is $k=2\pi/\lambda$; the amplitude reflectivity and the amplitude transmittance of the non-polarizing beam splitter 12 for P polarized light are $R_P^{1/2}$ and $T_P^{1/2}$, respectively; and the amplitude reflectivity and the amplitude transmittance of the non-polarizing beam splitter 12 for S polarized light are $R_s^{1/2}$ and $T_s^{1/2}$, respectively, and that the amplitude of the P polarized light component is $E_{op}$ and the amplitude of the S polarized light component is $E_{os}$. Then, the intensity (power) $E_o^2$ of the incident light 11 is given in the following equation:

$$E_o^2 = E_{op}^2 + E_{os}^2 \tag{1}$$

The amplitude $E_{1p}$ of the P polarized light component out of the interference light 21 entering the light receiver 23 is expressed by the following equation:

$$E_{1p} = E_{op} R_p^{1/2}(\exp(-ikL_1) + \exp(-ikL_2)) \tag{2}$$

Similarly, the amplitude $E_{1s}$ of the S polarized light component out of the interference light 21 is expressed by the following equation:

$$E_{1s} = E_{os} R_s^{1/2} T_s^{1/2}(\exp(-ikL_1) + \exp(-ikL_2)) \tag{3}$$

From the equations (2) and (3), there are obtained the following equations (4) and (5) for the powers $I_{1p}$ and $I_{1s}$ of the P and S polarized light components, respectively out of the interference light 21:

$$I_{1p} = |E_{1p}|^2 = 2(E_{op})^2 R_p T_p \{1 + \cos(kn(L_1 - L_2))\} \tag{4}$$

$$I_{1s} = |E_{1s}|^2 = 2(E_{os})^2 R_s T_s \{1 + \cos(kn(L_1 - L_2))\} \tag{5}$$

The power (intensity) $I_1$ of the interference light 21 is:

$$I_1 = I_{1p} + I_{1s} \tag{6}$$

It can be seen from the equations (4) and (5) that $I_{1p}$ and $I_{1s}$ will vary depending on the polarization state. Specifically, even though the intensity of the incident light 11 is of the same magnitude, $R_p T_p$ in the equation (4) and $R_s T_s$ in the equation (5) are parameters which are variable depending on the polarization state, so that there may be many cases where $R_p T_p \neq R_s T_s$. Consequently, the level of the electric signal output of the light-receiver 23 varies depending on the polarization state. Such variation in electric signal level can be as great as about 3 dB, depending on the polarization characteristics of the non-polarizing beam splitter 12. This can detract from the accurate measurement when the polarization states are indefinite or when the measurement is carried out while changing the polarization states.

Here, in order to indicate the polarization states, assuming that the proportion of the S polarized light component is M whereas that of the P polarized light component is (1−M), the light intensity of the S polarized light component of the incident ray 11 will be $E_{os}^2 = ME_o^2$ while the light intensity of the P polarized light component will be $E_{op}^2 = (1-M) E_o^2$. Substituting these terms into the equations (4), (5) and (6) provides the following equations (7), (8) and (9), respectively:

$$I_{1p} = |E_{1p}|^2 = 2(1-M)E_o^2 R_p T_p \{1 + \cos(kn(L_1 - L_2))\} \tag{7}$$

$$I_{1s} = |E_{1s}|^2 = 2ME_o^2 R_s T_s \{1 + \cos(kn(L_1 - L_2))\} \tag{8}$$

-continued $$I_1 = I_{1p} + I_{1s} \quad (9)$$
$$= 2E_o^2\{1 + \cos(kn(L_1 - L_2))\}\{(1 - M)R_pT_p + R_sT_s\}$$
$$= E_o^2\{1 + \cos(kn(L_1 - L_2))\}S(M)$$
$$S(M) = 2\{(1 - M)R_pT_p + MR_sT_s\} \quad (10)$$

In the equation (9) the factor which is dependent on the polarized light is expressed as S (M) in the right side to simplify the expression with S (M) representing the term shown in the equation (10). It is because of this polarized light-dependent factor S (M) that the output level of the light-receiver 23 varies.

As discussed above, if there are changes in the polarization state of the incident light, the conventional Michelson interferometer may be incapable of accurately measuring the light power spectrum due to the polarized light-dependent factor S (M), resulting in errors in measurements. This imposes a limitation on the use in measuring an incident ray the polarization state of which varies, undesirably leading to inconvenience in practical use.

Accordingly, an object of this invention is to provide a Michelson interferometer capable of accurately measuring a light power spectrum at all times regardless of the polarization state of the incident ray.

DISCLOSURE OF THE INVENTION

According to one aspect of this invention, in a conventional Michelson interferometer, an incident light is introduced into the non-polarizing beam splitter through a polarizing/separating element. The orthogonal polarized components of the incident light separated by the polarizing/separating element have their polarizing directions oriented at 45 degrees in opposite directions to a line on the reflecting/transmitting face perpendicular to a plane defined by the incident light, reflected ray and transmitted ray prior to the polarized light components entering the reflecting/transmitting face.

The distances from the non-polarizing beam splitter to the points of reflection on the stationary reflector where the separated orthogonal polarized light components are reflected are different from each other such that the optical path lengths that the orthogonal polarized light components travel to and from the stationary reflector are equal to each other, and likewise the distances from the non-polarizing beam splitter to the points of reflection on the moving reflector where the orthogonal polarized light components are reflected are different from each other such that the optical path lengths that the orthogonal polarized light components travel to and from the moving reflector are equal to each other.

The interference rays of the separated orthogonal polarized light components are received and converted to electric signals by separate respective light-receivers. One of the outputs of the two light-receivers is retarded by an amount of delay corresponding to the optical path difference between the separated polarized light components before the two outputs are combined together.

Each of stationary and moving reflectors may comprise a corner cube.

According to a second aspect of this invention, a ½ wavelength plate is inserted in either the forward or return path each of the to-and-fro optical paths between the non-polarizing beam splitter and the stationary reflector 16 and between the non-polarizing beam splitter and the moving reflector.

In place of such ½ wavelength plates, two serially located ¼ wavelength plates may be inserted in each of the to-and-fro optical paths.

According to a third aspect of the invention, instead of the non-polarizing beam splitter, an optical coupler is used. The incident light is introduced into the first port of the optical coupler and is divided thereby and emerges therefrom through its second and third ports. These exitting rays are reflected by a stationary reflector and a moving reflector, respectively, to be returned to the optical coupler. ¼ wavelength plates are inserted between the second port and the stationary reflector and between the third port and the moving reflector. The light exitting through the fourth port is received by a light-receiver 23.

According to a fourth aspect of the invention, two interference lights emerging from the non-polarizing beam splitter in different directions are received by respective light-receivers where they are converted to electric signals. The output of one of the light-receivers is divided into a direct current component and an alternating current component. The outputs from the two light-receivers are added together, and the sum of the outputs is divided by the DC current and then multiplied by the AC current.

If desired, the processing of the outputs of the light-receivers may be carried out after they have been converted to digital signals. In that case, the A/D converter may be utilized in common with to the outputs of the two light-receivers.

BRIEF DESCRIPTION OF THE DRAWINGS

FIG. 2 illustrates an embodiment of the first aspect of the invention, FIG. 2A showing the non-polarizing beam splitter with the reflectors shown in a plan view while

BEST MODES FOR CARRYING OUT THE INVENTION

Figure 1:
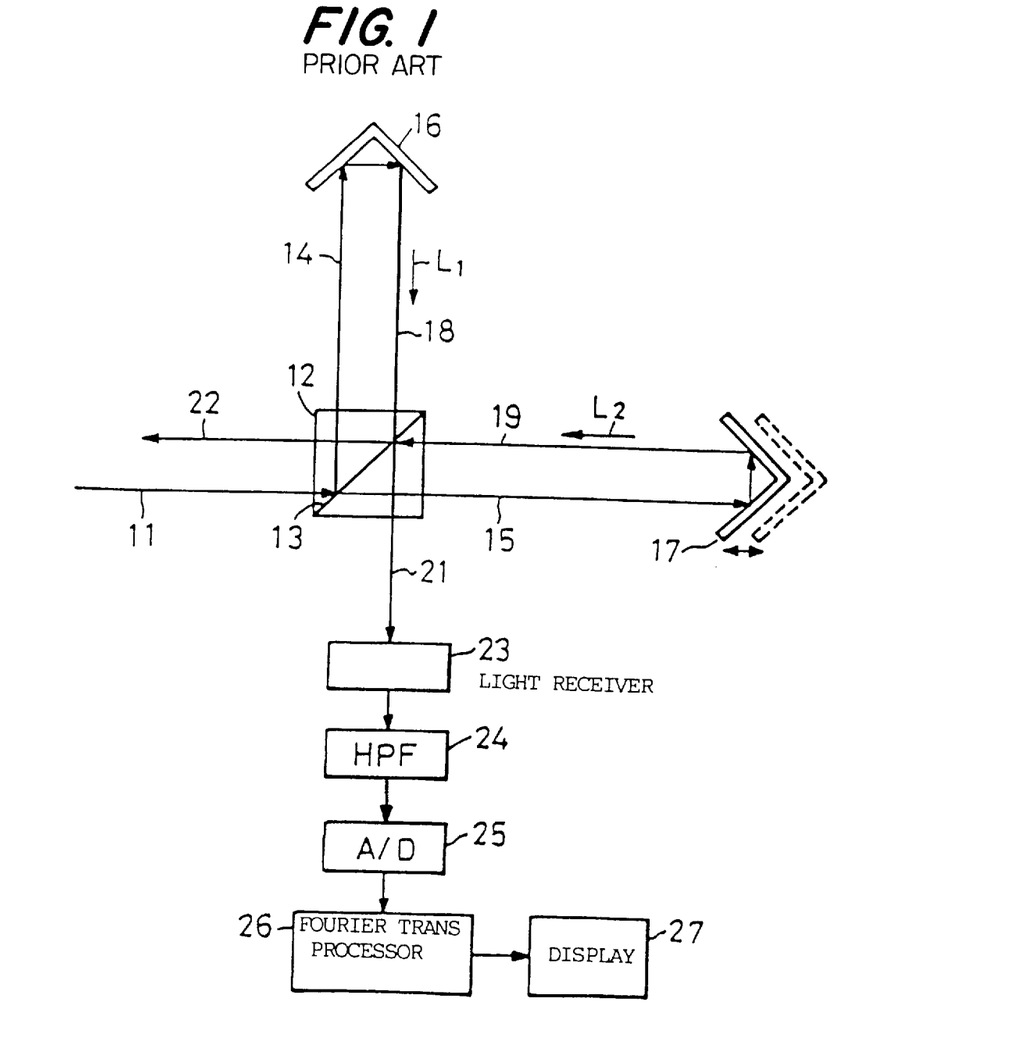
FIG. 1 is a block diagram illustrating a conventional Michelson interferometer.

FIG. 2 illustrates an embodiment of the first aspect of the invention in which the reference numerals correspond to those of FIG. 1 for the common components.

According to the first aspect, the incident light 11 is introduced into a non-polarizing beam splitter 12 through a polarizing/separating element 31 which may comprise a Rochon prism, Wollaston prism or a Savart plate for separating the incident light 11 into orthogonal polarized light components. The incoming light 11 is thus separated by the polarizing/separating element 31 into orthogonal polarized light components 11a and 11b (FIG. 2B) prior to entering the non-polarizing beam splitter 12.

Figure 3A:
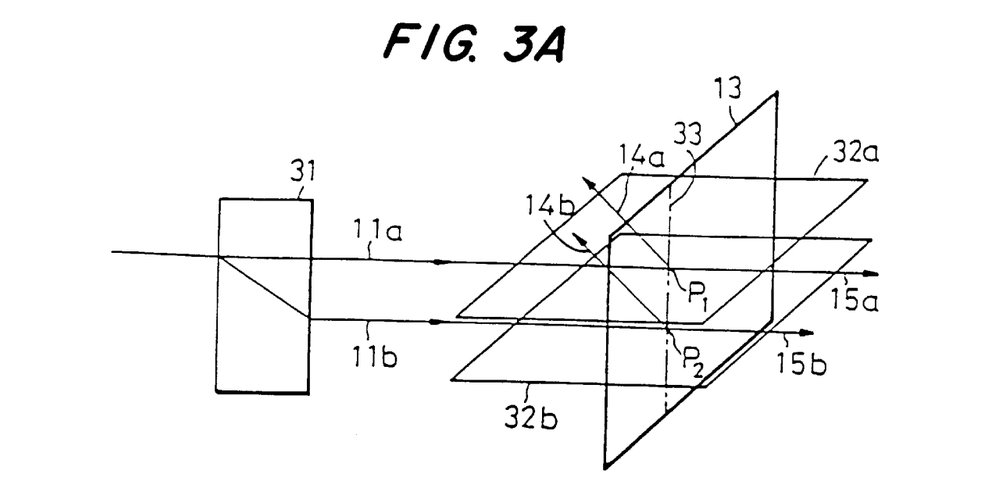
FIG. 3A illustrates the relation between the separated polarized light components 11a, 11b from the polarizing/separating element 31 shown in FIG. 2 and the reflecting/transmitting face 13 of the beam splitter 12.
Figure 3B:
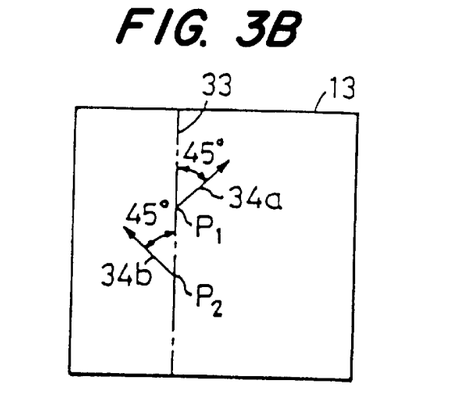
FIG. 3B shows the relation of the polarizing directions 34a, 34b of the separated polarized light components with respect to a straight line 33 on the reflecting/transmitting front face 13 perpendicular to a plane defined by the incoming rays and reflected rays.

These orthogonal polarized light components 11a and 11b are in turn divided by the reflecting/transmitting face 13 into reflected rays 14a, 14b and transmitted rays 15a, 15b, respectively, as shown in FIG. 3A. The orientation of the polarizing/separating element 31 is set up relative to the non-polarizing beam splitter 12 such that as illustrated in FIG. 3A, B, the orthogonal polarized light components 11a and 11b will pass through the points $P_1$, $P_2$ of incidence at the reflecting/transmitting face 13 and that the polarizing direction 34a of one 11a of the polarized light components is oriented at 45 degrees in one direction with respect to a line 33 on the reflecting/transmitting face 13 perpendicular to a plane 32a defined by the polarized light component 11a, the reflected ray 14a and the transmitted ray 15a while the polarizing direction 34b of the other polarized light component 11b is oriented at 45 degrees in the opposite direction with respect to the line 33 perpendicular to a plane 32b defined by the polarized light component 11b, the reflected ray 14b and the transmitted ray 15b. In the illustrated embodiment, the set-up is such that both of the points $P_1$, $P_2$ of incidence lie on the perpendicular line 33.

The reflected rays 14a, 14b and the transmitted rays 15a, 15b out of the polarized light components 11a and 11b are reflected by the stationary reflector 16 and the moving reflector 17, respectively back into the non-polarizing beam splitter 12 where interference rays 21a and 21b are formed by interference between the reflected ray 14a and the transmitted ray 15a and between the reflected ray 14b and the transmitted ray 15b, respectively. The interference rays 21a and 21b are then received by a common light-receiver 23.

The amplitudes $E_{oa}$ and $E_{ob}$ of the polarized light components 11a and 11b, respectively are in the relationship expressed by the following equation:

$$|E_o|^2 = |E_{oa}|^2 + E_{ob}^2 \quad (11)$$

Assuming that the amplitudes of the P wave component and S wave component of the polarized light component 11a at the reflecting/transmitting face 13 are $E_{oap}$ and $E_{oas}$, respectively, the power (intensity) $|E_{1a}|^2$ of the interference ray 21a may be expressed by the following equation on the basis of the equations (4) to (6):

$$|E_{1a}|^2 = 2E_{oas}^2 R_s T_s \{1 + \cos kn(L_1-L_2)\} + 2E_{oap}^2 R_p T_p \{1 + \cos kn(L_1-L_2)\}$$

In view of the fact that the amplitudes $E_{oas}$ and $E_{obs}$, of the P and S wave components of the polarized light component 11a are equal to each other because of the polarizing direction of the polarized light component 11a being related to the non-polarizing beam splitter 12 as shown in FIG. 3A, B, the above equation may be transformed to the following equation (12):

$$|E_{1a}|^2 = 2E_{oas}^2 (R_s T_s + R_p T_p) \{1 + \cos kn(L_1-L_2)\} \quad (12)$$

Likewise, assuming that the amplitudes of the P wave component and S wave component of the polarized light component 11b are $E_{obp}$ and $E_{obs}$, respectively, the power $|E_{1b}|^2$ of the interference light 21b may be expressed by the following equation (13):

$$|E_{1b}|^2 = 2E_{obs}^2 (R_s T_s + R_p T_p) \{1 + \cos kn(L_1-L_2)\} \quad (13)$$

From the above equations (12) and (13) as well as (11), the power $|E_1|^2$ of the interference light 21 may be expressed by the following equation (14):

$$\begin{aligned} |E_1|^2 &= |E_{1a}|^2 + |E_{1b}|^2 \\ &= 2\{E_{oas}^2 + E_{obs}^2\}(R_s T_s + R_p T_p)\{1 + \cos kn(L_1-L_2)\} \\ &= E_o^2(R_s T_s + R_p T_p)\{1 + \cos kn(L_1-L_2)\} \end{aligned} \quad (14)$$

Since the quantity of $R_s T_s + R_p T_p$ is constant, the interference light 21 is not affected by the polarized light-dependency.

Figure 2A:
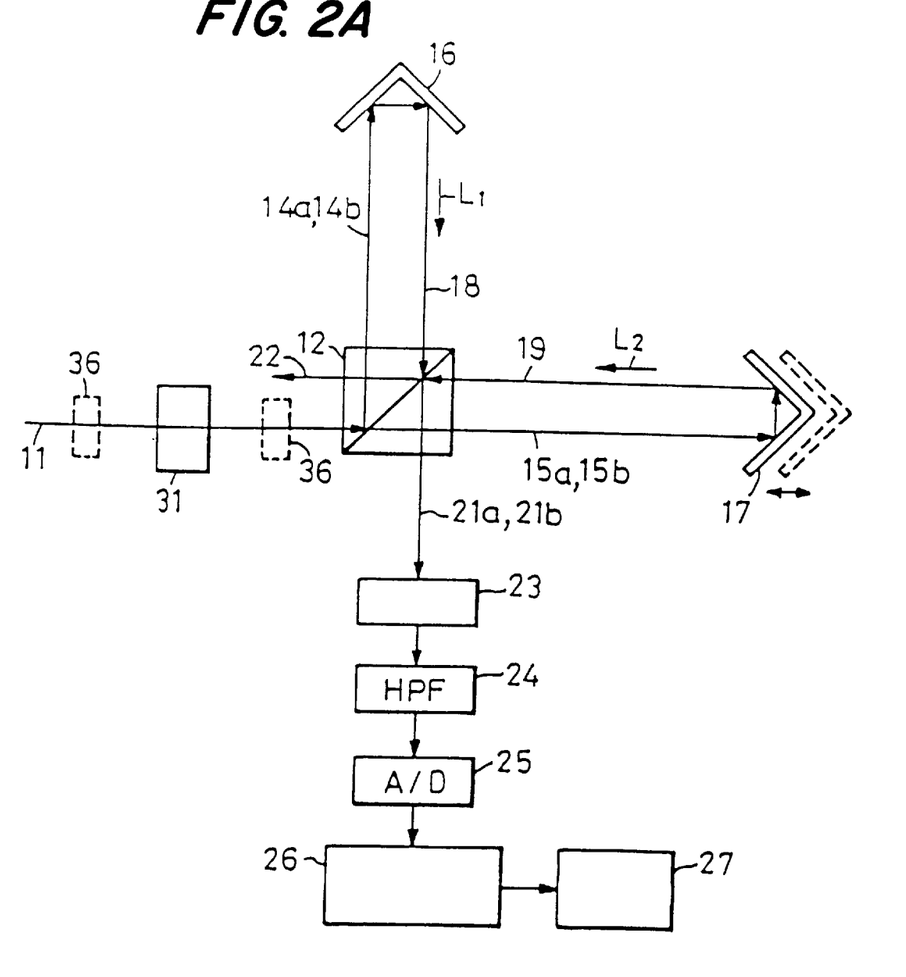
Figure 2B:
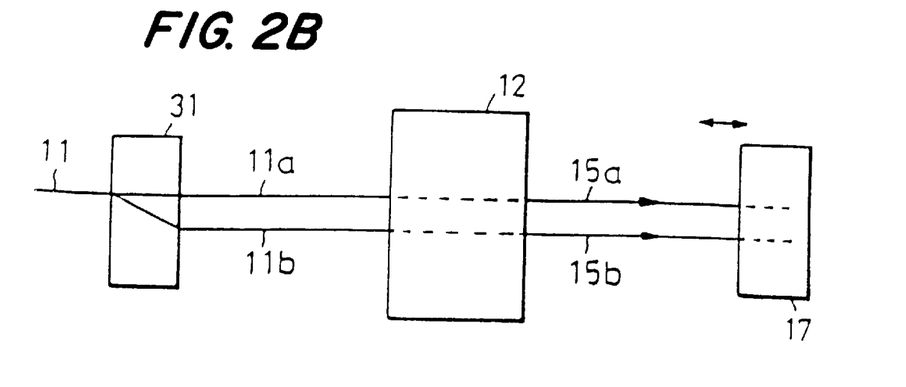
FIG. 2B shows the non-polarizing beam splitter and reflectors in a front view and a side view, respectively.

In FIG. 2A, in the case where the incoming light 11 is not parallel rays, a collimator 36 may be disposed either ahead of or behind the polarizing/separating element 31 as shown in phantom lines so that each of the polarized light components 11a, 11b is introduced as parallel rays into the non-polarizing beam splitter 12.

Figure 3C:
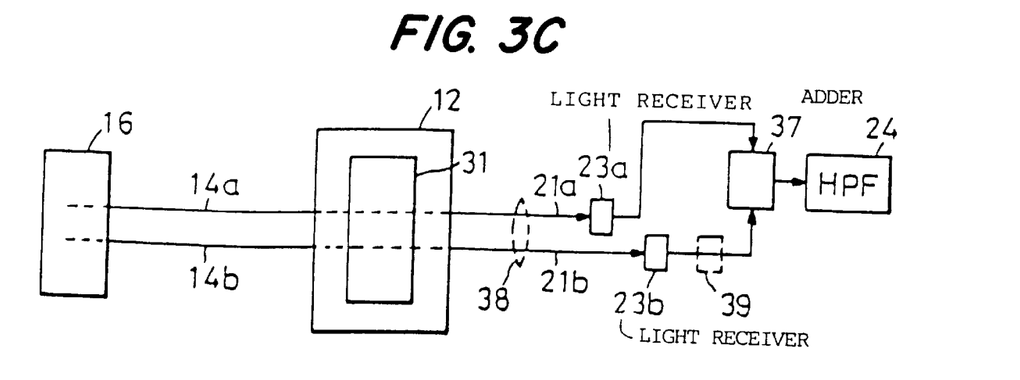
FIG. 3C is a view similar to that seen from the left side of FIG. 2A, but shows an alternative form of the embodiment of FIG. 2A.

As an alternative, the interference rays 21a and 21b of the two polarized light components emerging from the non-polarizing beam splitter 12 may be received by separate light-receivers 23a and 23b, respectively having equal sensitivities, so that the output electric signals of the light-receivers 23a and 23b may be added together by an adder 37 to be provided to a high-pass filter 24, as illustrated in FIG. 3C. In this case, as shown in dotted lines, a collective lens 38 may be used as required to reduce the beam diameter of the interference rays 21a, 21b prior to the light rays being received by the light-receivers 23a and 23b.

Figure 4A:
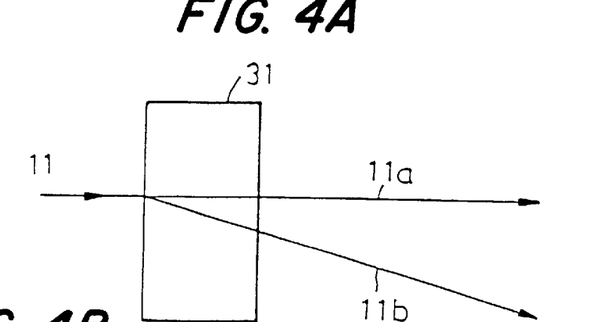
FIG. 4A sketches the state in which the separated polarized light components are not in parallel.

If the output light beams from the polarizing/separating element 31, that is, the polarized light components 11a and 11b are not parallel to each other as shown in FIG. 4A, the reflected beams 14a and 14b would be different from each other in their optical path lengths $L_{1a}$ and $L_{1b}$ between the non-polarizing beam splitter 12 and the stationary reflector 16, and likewise the transmitted rays 15a and 15b would be different from each other in their optical path lengths $L_{2a}$ and $L_{2b}$ between the non-polarizing beam splitter 12 and the moving reflector 17.

Figure 4B:
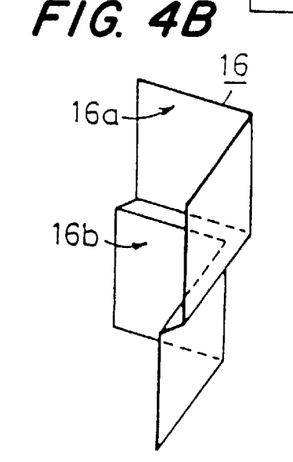
FIG. 4B is a perspective view of a stationary reflector compensating for an optical path difference between the separated polarized light components.
Figure 4C:
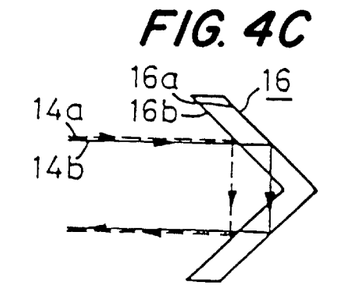
FIG. 4C is a plan view of the stationary reflector.

In order to make the optical path lengths $L_{1a}$ and $L_{1b}$ equal, the stationary reflector 16 may comprise two half segments, the arrangement being such that the reflecting surface 16a of one of the half segments is more distant from the non-polarizing beam splitter 12 than the reflecting surface 16b of the other half segment is so that the optical path lengths $L_{1a}$ and $L_{1b}$ are equal, as illustrated in FIG. 4B and C. The moving reflector 17 may also be constructed in a similar fashion so as to make the optical path lengths $L_{2a}$ and $L_{2b}$ equal.

Alternatively, in the embodiment as illustrated in FIG. 3C where two light-receivers 23a and 23b are employed, either one of the outputs of the light-receivers 23a and 23b which corresponds to the longer optical path may be delayed by a delay element 39 as shown in FIG. 3C to compensate for the difference in length of the optical paths.

The stationary reflector 16 and moving reflector 17 are not limited to ones which comprise two plane mirrors, but may be a corner cube comprising three plane mirrors as is often used with the prior art Michelson interferometer. In that case, the arrangement as shown in FIG. 4B and C need not be employed, and the delay element as shown in FIG. 3C may also be eliminated.

Figure 5A:
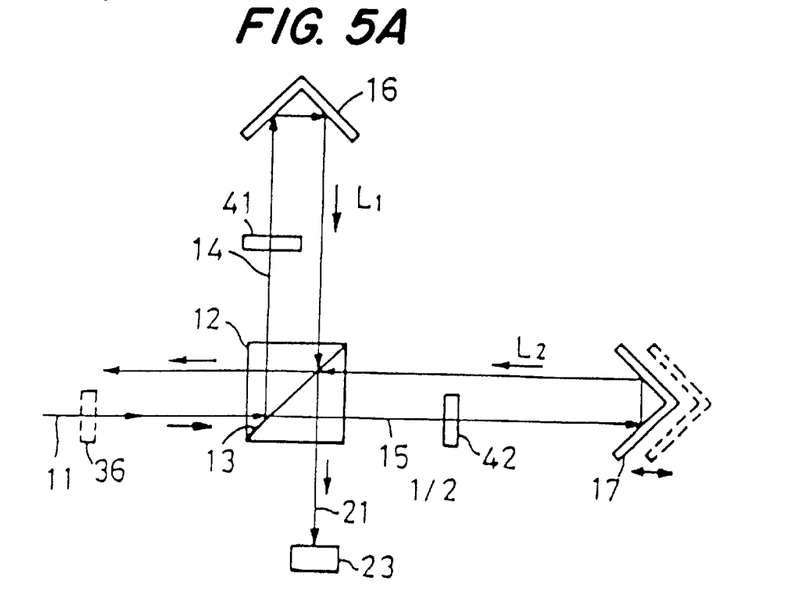
FIGS. 5A and 5B are block diagrams illustrating embodiments of the second aspect of the invention.

FIG. 5A illustrates an embodiment of the second aspect of the invention in which the numerals correspond to those of FIG. 1 for the common components. In this aspect of the invention, a ½ wavelength plate 41 is inserted in either the forward or return path (the forward path in the illustrated example) of the to-and-fro optical path of the reflected light 14 between the non-polarizing beam splitter 12 and the stationary reflector 16. Likewise, a ½ wavelength plate 42 is inserted in either the forward or return path (the forward path in the illustrated example) of the to-and-fro optical path of the transmitted light 15 between the non-polarizing beam splitter 12 and the moving reflector 17. The ½ wavelength plates 41 and 42 act to rotate the associated polarizing directions by 90 degrees, so that upon the P polarized component and S polarized component of the reflected light 14 being passed through the ½ wavelength plate 41, they are turned into S polarized light component and P polarized light component, respectively. Similarly, upon the P polarized component and S polarized component of the transmitted light 15 being passed through the ½ wavelength plate 42, they are turned into S polarized component and P polarized component, respectively. Accordingly, the amplitude $E_{1p}$ of the P polarized component of the interference light 21 is given in the following equation:

$$E_{1p}=E_{op}\{R_p^{1/2}T_s^{1/2}\exp(-jkL_1)+T_p^{1/2}R_s^{1/2}\exp(-jkL_2)\} \quad (15)$$

Similarly, the amplitude $E_{1s}$ of the S polarized light component out of the interference light 21 is given in the following equation:

$$E_{1s}=E_{os}\{R_s^{1/2}T_p^{1/2}\exp(-jkL_1)+T_s^{1/2}R_p^{1/2}\exp(-jkL_2)\} \quad (16)$$

From these equations, there are obtained the following equations (17) and (18) for the powers $I_{1p}$ and $I_{1s}$ of the P and S polarized components, respectively out of the interference light 21:

$$I_{1p}=|E_{1p}|^2=E_{op}^2\{R_pT_s+T_pR_s+2(R_pR_sT_pT_s)^{1/2}\cos k(L_1-L_2)\} \quad (17)$$

$$I_{1s}=|E_{1s}|^2=E_{os}^2\{R_pT_s+T_pR_s+2(R_pR_sT_pT_s)^{1/2}\cos k(L_1-L_2)\} \quad (18)$$

The power $I_1$ of the interference light 21 is $(I_{1p}+I_{1s})$, the right sides of the equations (17) and (18) are the same except for the terms $E_{op}^2$ and $E_{os}^2$, and the power $I_1$ has nothing to do with the proportion between the P polarized light component and the S polarized light component. It is thus to be understood that the power of the interference light is not affected by the polarized light-dependency of the non-polarizing beam splitter 12.

Figure 5B:
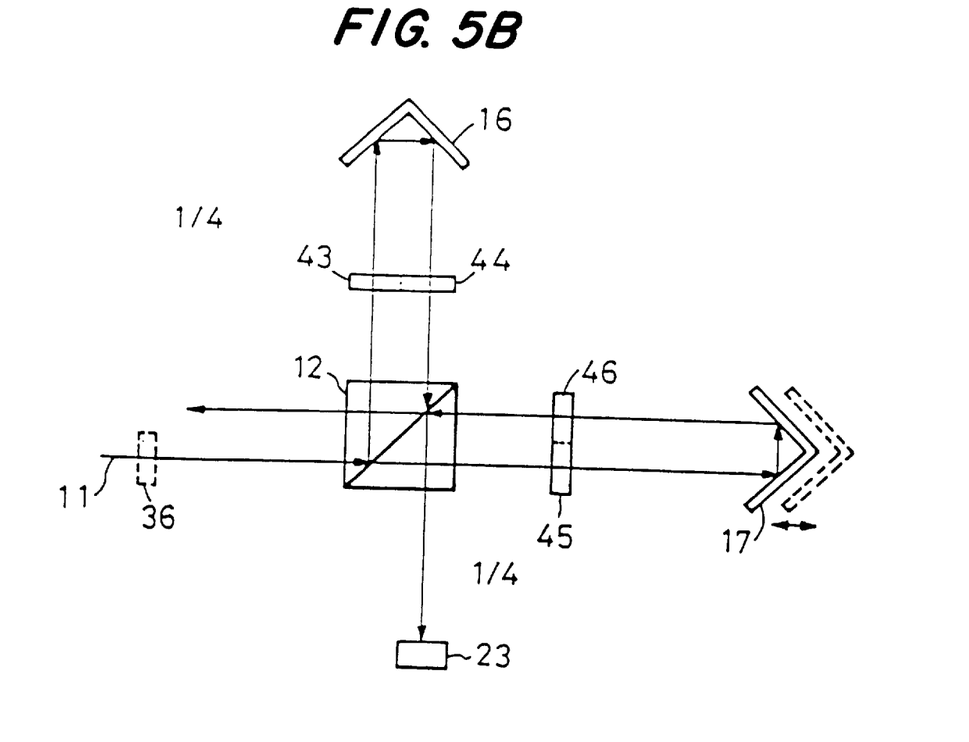

A modified embodiment of the second aspect of the invention is shown in FIG. 5B. This embodiment is distinct from the embodiment of FIG. 5A in that the ½ wavelength plates 41, 42 are eliminated and instead ¼ wavelength plates are used. Specifically, ¼ wavelength plates 43 and 44 are inserted in the forward and return paths, respectively of the to-and-fro optical path of the reflected light 14 between the non-polarizing beam splitter 12 and the stationary reflector 16. Likewise, ¼ wavelength plates 45 and 46 are inserted in the forward and return paths, respectively of the to-and-fro optical path of the transmitted light 15 between the non-polarizing beam splitter 12 and the moving reflector 17. Thus, the reflected light 14 has its polarizing direction rotated by 45 degrees by each of the two ¼ wavelength plates, whereby the P polarized component and S polarized component of the reflected light 14 are turned into S polarized light component and P polarized light component, respectively before returning to the non-polarizing beam splitter 12. Similarly, the P polarized component and S polarized component of the transmitted light 15 are turned into S polarized light component and P polarized light component, respectively by the two ¼ wavelength plates 45, 46 before returning to the non-polarizing beam splitter 12. Consequently, this invention is capable of measuring the power of the interference light without being affected by the polarized light-dependency of the non-polarizing beam splitter 12 as is the case with the embodiment of FIG. 5A.

As shown in FIG. 5B, the two ¼ wavelength plates 43, 44 may be positioned at equal distances from the non-polarizing beam splitter 12 and be united into a monolithic ¼ wavelength plate common to the forward and return paths of the reflected light. Similarly, the two ¼ wavelength plates 45, 46 may be united as a monolithic ¼ wavelength plate common with the forward and return paths of the transmitted light.

The ¼ wavelength plates 43, 44 may be positioned at any point along the to-and-fro optical path between the non-polarizing beam splitter 12 and the stationary reflector 16. They may need not be disposed separately in the forward and return paths, but may be inserted in the forward path only or in the return path only. Likewise, the ¼ wavelength plates 45, 46 may be positioned at any point along the to-and-fro optical path between the non-polarizing beam splitter 12 and the moving reflector 17.

Figure 6:
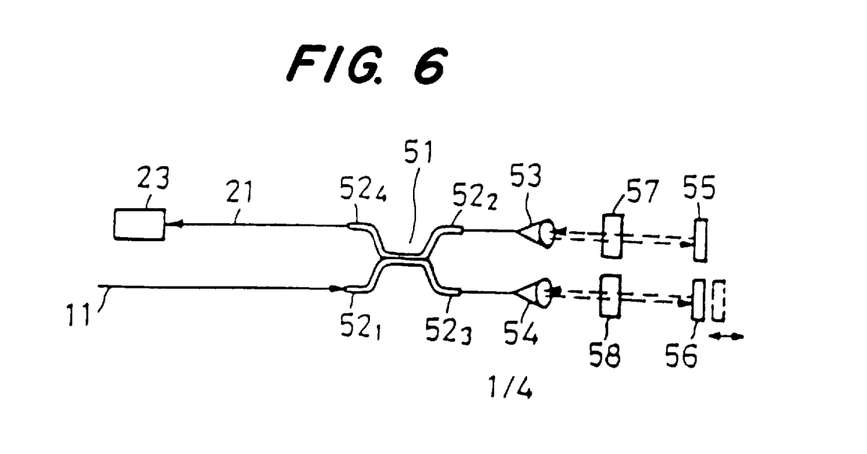
FIG. 6 is a block diagram illustrating an embodiment of the third aspect of the invention.

FIG. 6 illustrates an embodiment of the third aspect of the invention. Instead of the non-polarizing beam splitter, this embodiment uses an optical coupler 51 having first to fourth ports $52_1$ to $52_4$, respectively which comprises optical fibers in the illustrated embodiment but which may comprise an optical integrated circuit. The incident light 11 is introduced into the optical coupler 51 through its first port $52_1$ and is divided thereby and emerges therefrom through its second and third ports $52_2$ and $52_3$, respectively. These exitting rays are collimated into parallel rays through collimators 53 and 54, respectively before they enter a stationary reflector 55 and a moving reflector 56, respectively, whereupon they are reflected by the stationary reflector 55 and moving reflector 56 to be returned along the same optical paths through the respective collimators 53 and 54 and then through the second and third ports $52_2$ and $52_3$ to the optical coupler 51 where the returning reflected rays are recombined to interfere with each other. The resulting interference light 21 exits through the fourth port $52_4$ and is received by a light-receiver 23. The moving reflector 56 is moved toward and away from the collimator 54.

Again, with this interferometer, the power of the interference light 21 would vary depending on the polarization state of the incident light 21 due to the polarized light-dependency of the optical coupler 51. According to the present invention, however, this drawback is overcome by inserting ¼ wavelength plates 57 and 58 in the to-and-fro optical paths between the collimator 53 and the stationary reflector 55 and between the collimator 54 and the moving reflector 56, respectively so that the rays exitting the collimators 53 and 54 pass two times through the respective ¼ wavelength plates 57 and 58, one time each in the forward and return optical paths. Accordingly, as in the embodiment of FIG. 5B, the rays exitting the collimators 53 and 54 have their P polarized component and S polarized component turned into S polarized light component and P polarized light component, respectively before returning to the respective collimators 53 and 54. It is thus to be appreciated that the problem of polarized light-dependency with the optical coupler 51 is solved. In this embodiment as well, the two ¼ wavelength plates 57 and 58 may be united as a monolithic plate.

Figure 7:
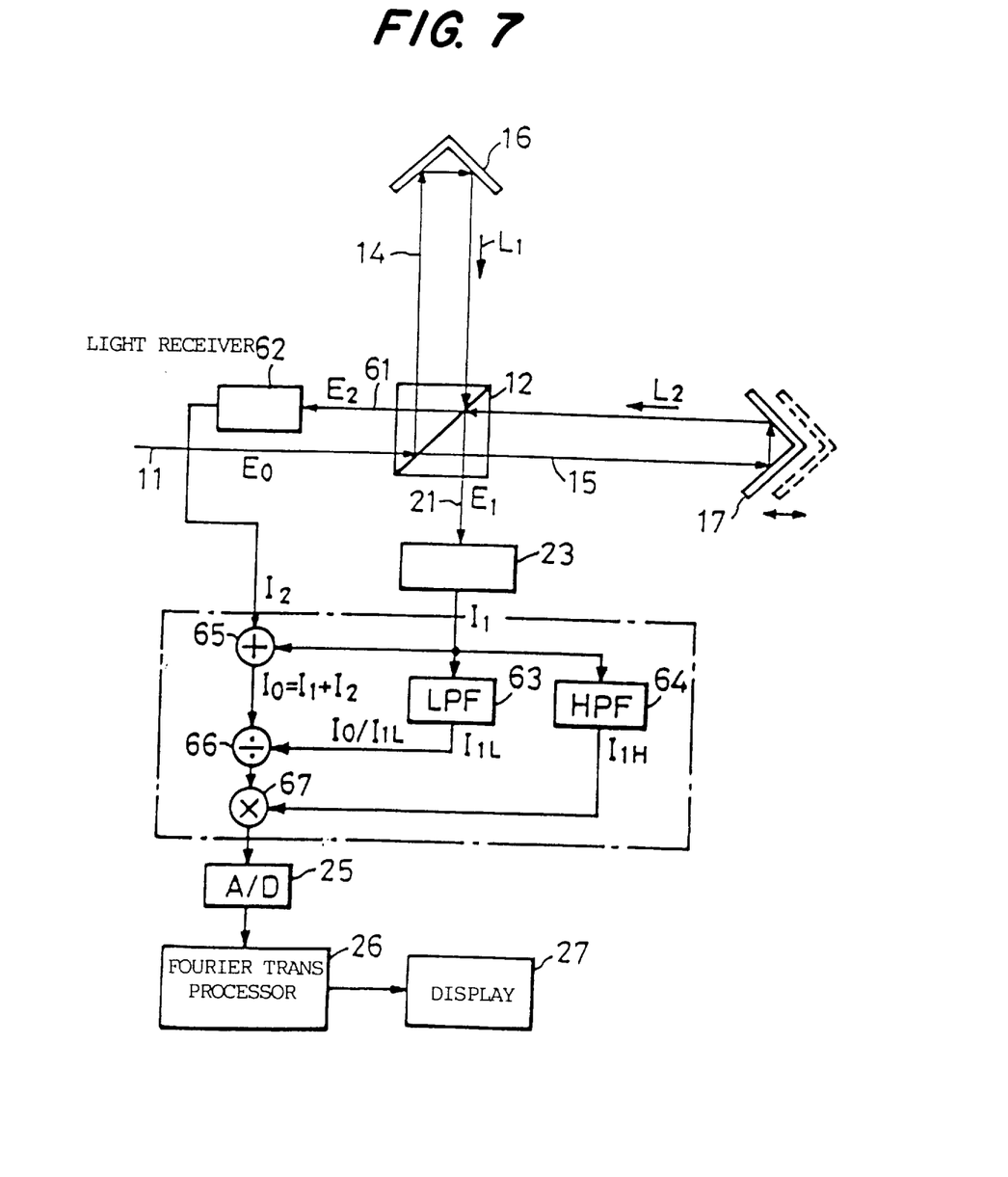
FIG. 7 is a block diagram illustrating an embodiment of the fourth aspect of the invention.

FIG. 7 illustrates an embodiment of the fourth aspect of the invention in which the reference numerals correspond to those of FIG. 1 for the common components. In this aspect of the invention, another interference light 61 emerging from the non-polarizing beam splitter 12 in a direction different from that in which the interference light 21 exits is also utilized and received by a light-receiver 61 having a sensitivity equal to that of the light-receiver 23.

An electric signal output of the light-receiver 23 is provided to a low-pass filter 63, a high-pass filter 64 and one input of an adder 65. A direct current component is taken out of the low-pass filter 63 and sent to a divisor input of a divider 66 while an alternating current component corresponding to a change in intensity of the interference light 21 occurring with the movement of the moving reflector 17 is extracted from the high-pass filter 64 and passed to one input of a multiplier 67. An electric signal output from the other light-receiver 62 is fed to the other input of the adder 65, the output of which is in turn sent to a dividend input of the divider 66, the output of which is in turn fed to the other input of the multiplier 67. The output of the multiplier 67 is passed to an A/D converter 25.

The amplitude $E_{2p}$ of the P polarized component of the interference light 61 is expressed by the following equation:

$$E_{2p}=E_{op}\{R_p \exp(-jkL_1)+T_p \exp(-jkL_2)\} \tag{19}$$

The amplitude $E_{2s}$ of the S polarized light component of the interference light 61 is expressed by the following equation:

$$E_{2s}=E_{os}\{R_s \exp(-jkL_1)+T_s \exp(-jkL_2)\} \tag{20}$$

The power (intensity) $I_{2p}$ of the P polarized component of the interference light 61 is given in the equation (21) below:

$$\begin{aligned} I_{2p} &= |E_{2p}|^2 \tag{21}\\ &= E_{op}^2\{R_p^2 + T_p^2 - 2R_pT_p\cos\{kn(L_1-L_2)\}\} \\ &= (1-M)E_o^2\{R_o^2 + T_p^2 - 2R_pT_p\cos\{(kn(L_1-L_2)\}\} \end{aligned}$$

Similarly, the power (intensity) $I_{2s}$ of the S polarized component of the interference light 61 is expressed by the equation (22) below:

$$I_{2s}=|E_{2s}|^2=ME_o^2\{R_s^2+T_s^2-2R_sT_s\cos\{kn(L_1-L_2)\}\} \tag{22}$$

Accordingly, the power $I_2$ of the interference light 61 is expressed by the equation (23) below:

$$\begin{aligned} I_2 &= I_{2p}+I_{2s} \tag{23}\\ &= E_o^2\{(1-M)(R_p^2+T_p^2)+M(R_s^2+T_s^2)- \\ &\quad 2\cos\{kn(L_1-L_2)\}\{(1-M)R_pT_p+MR_sT_s\} \end{aligned}$$

Assuming that there is no absorption in the non-polarizing beam splitter, $R_p+T_p=1$ and $R_s+T_s=1$. Consequently, $R_p^2+T_p^2=1-2R_pT_p$ and $R_s^2+T_s^2=1-2R_sT_s$. By substituting these terms as well as the equation (10) into the equation (23), the latter is transformed as follows:

$$\begin{aligned} I_2 &= E_o^2\{(1-M)(1-2R_pT_p)+M(1-2R_sT_s)- \tag{24}\\ &\quad S(M)\cos(kn(L_1-L_2))\} \\ &= E_o^2\{(1-S(M)\{1+\cos(kn(L_1-L_2))\}\} \end{aligned}$$

Substituting the equation (9) into the equation (24) gives the following equation:

$$I_2=E_o^2-I_1 \tag{25}$$

This means that the sum of the powers $I_1$ and $I_2$ of the interference lights 21 and 61, respectively, is the power $E_o^2$ ($=I_o$) of the incident light. If the outputs of the low-pass filter 63 and high-pass filter 64 are $I_{1L}$ and $I_{1H}$ respectively, usually $I_1=I_{1L}+I_{1H}$. If the alternating current component $\cos(kn(L_1-L_2))$ corresponding to the change in the optical path length $L_2$ is represented by A in order to simplify the expression, the equation (9) will be:

$$I_1=I_o(1+A)S(M) \tag{26}$$

From the equation (26), the outputs $I_{1L}$ and $I_{1H}$ of the low-pass filter 63 and high-pass filter 64 will be $I_{1L}=I_o S(M)$ A and $I_{1H}=I_o S(M) A$, respectively. While it is only required to Fourier transform the equation $I_{1H}=I_o S(M)$ A in order to determine the light power spectrum, the term $I_{1H}$ contains polarized light-dependent components. When the output ($I_o=I_1+I_2$) of the adder 65 is divided by the output $I_{1L}$ of the low-pass filter 63 and then multiplied by the output $I_{1H}$ of the high-pass filter 64 at the divider 66 and multiplier 67, respectively, $I_o \times I_o S(M)$ A / $I_o S(M)=I_o$ A, whereby the polarized light-dependent components are removed. This $I_o$ A is provided as an output of multiplier 67 to the A/D converter 25.

Figure 8A:
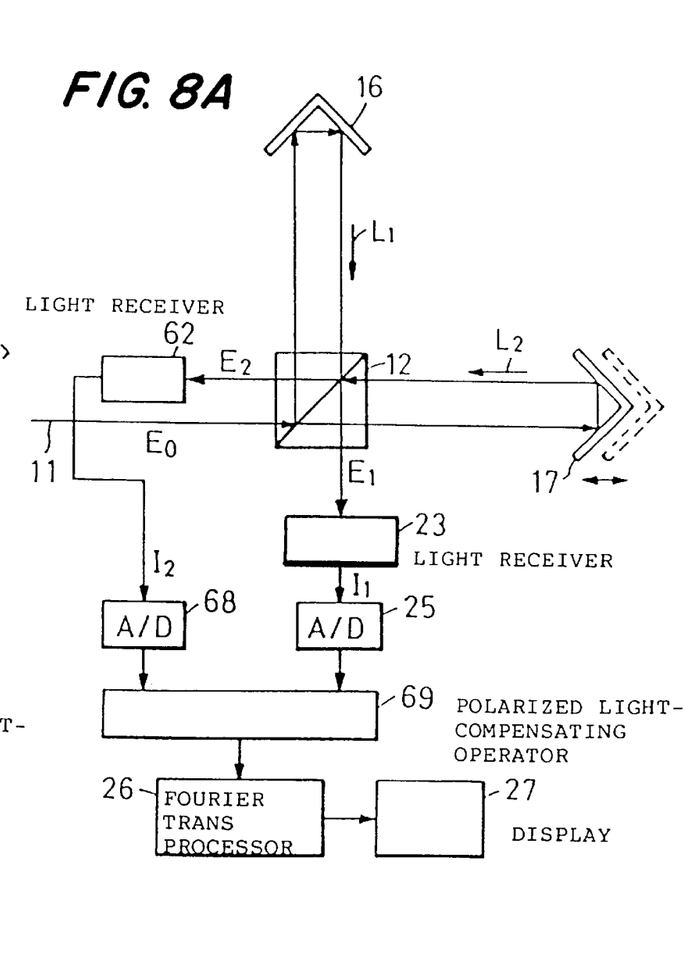
FIGS. 8A and 8B are block diagrams illustrating modified embodiments of the fourth aspect of the invention.

As an alternative, as illustrated in FIG. 8A, the outputs of the light-receivers 23 and 62 may be converted to digital signals at the A/D converters 25 and 68, respectively, and the output digital signals from those A/D converters may be subjected at a polarized light-compensating operator 69 to digital-processing similar to that effected by the low-pass filter 63, high-pass filter, adder 65, divider 66 and multiplier 67 prior to those digital signals being provided to the Fourier transform processor 26. The polarized light-compensating operator 69 may comprise either a hardware or a software.

Figure 8B:
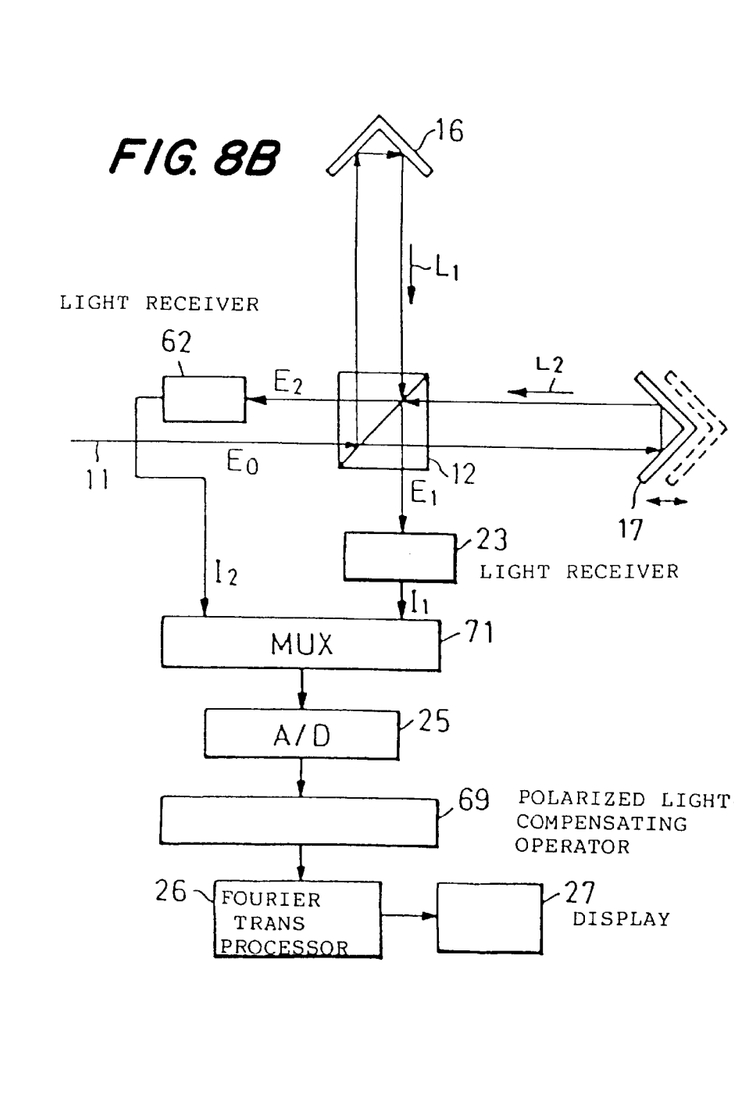

A further alternative embodiment is illustrated in FIG. 8B wherein the outputs of the light-receivers 23 and 62 are alternately taken out by an analog multiplexer 71 to be provided to the common A/D converter 25. The output digital signals from the A/D converter 25 is sent to the polarized light-compensating operator 69 where the input digital signals are separated into the one corresponding to the output of the light-receiver 23 and the one corresponding to the output of the light-receiver 62 prior to being subjected to processing similar to that effected by the polarized light-compensating operator 69 in FIG. 8A.

In FIG. 7, the division at the divider 66 and the multiplication at the multiplier 67 may be reversed in the sequence.

In the embodiments shown in FIGS. 5, 7 and 8, each of the stationary reflector 16 and moving reflector 17 may comprise a corner cube.

From the above discussion, it is to be appreciated that this invention is capable of accurately measuring a light power spectrum without being affected by the polarized light-dependency of either the non-polarizing beam splitter or the optical coupler, regardless of the polarization state of the incident ray 11, that is, whether the polarization state may be unknown or variable.

While the embodiments shown in FIGS. 5 and 6 may be useful on only the incident rays of the wavelength on which the wavelength plates may effectively work, the other embodiments may effectively work on any incident rays, irrespective of its wavelength.

We claim:

1. A Michelson interferometer, comprising:
   a non-polarizing beam splitter having a reflecting/transmitting face and adapted to receive an incident light and divide it into a reflected light reflected by said reflecting/transmitting face and a transmitted light passed through the reflecting/transmitting face;

a stationary reflector for reflecting one of said reflected and transmitted lights back to said beam splitter;

a moving reflector for reflecting the other of said reflected and transmitted lights back to said beam splitter, the distance between said moving reflector and said beam splitter being variable;

light-receiver means for receiving an interference light generated by the reflected light from said stationary reflector and the transmitted light from said moving reflector being recombined to interfere with each other at said beam splitter, and converting said interference light to an electric signal; and a polarizing/separating element located upstream of said beam splitter for spatially separating said incident light into orthogonal polarized light components and directing said separated orthogonal polarized light components toward the reflecting/transmitting face of said beam splitter such that the orthogonal polarized light components are projected onto the reflecting/transmitting face with their polarizing directions displaced by 45 degrees in opposite directions with respect to a line on the reflecting/transmitting face perpendicular to a plane defined by the incident light, the reflected light and the transmitted light.

2. The Michelson interferometer of claim 1 wherein, said stationary reflector being so arranged that the distances from the the reflecting/transmitting face of the beam splitter to points of incidence on the stationary reflector where said separated polarized light components enter are different from each other such that the optical path lengths of the separated polarized light components between the beam splitter and the stationary reflector are equal to each other, and said moving reflector being so arranged that the distances from the beam splitter to points of incidence on the moving reflector where said separated polarized light components enter are different from each other such that the optical path lengths of the separated polarized light components between the beam splitter and the moving reflector are equal to each other.

3. The Michelson interferometer of claim 1 wherein, each of said stationary reflector and said moving reflector comprises a corner cube.

4. The Michelson interferometer of claim 1 wherein, a collimator is disposed either upstream or downstream of said the polarizing/separating element to output said incident light as parallel rays.

5. The Michelson interferometer of any one of the preceding claims 1 wherein, said light-receiver means is used in common with the respective interference lights generated from said separated polarized light components.

6. The Michelson interferometer of claim 1 wherein, said light-receiver means includes two separate light-receivers for the respective interference lights generated from said separated polarized light components, and further comprising a retardation element for retarding one of the outputs of the two light-receivers by an amount of delay corresponding to a difference in said optical path lengths, and means for combining said one retarded output and the other of the outputs of the two light-receivers.

* * * * *